United States Patent Office 3,156,720
Patented Nov. 10, 1964

3,156,720
ETHYLENICALLY UNSATURATED DERIVATIVES
OF ORTHO-DIHYDRIC PHENOLS
Albert I. Goldberg, Berkeley Heights, N.J., and Joseph
Fertig and Martin Skoultchi, New York, N.Y., assignors to National Starch and Chemical Corporation, New
York, N.Y., a corporation of Delaware
No Drawing. Filed Aug. 24, 1962, Ser. No. 219,119
7 Claims. (Cl. 260—486)

This invention relates to the preparation of novel ethylenically unsaturated derivatives of ortho-dihydric phenols and, more particularly, to ethylenically unsaturated ethers of said ortho-dihydric phenols.

Polymers and copolymers prepared from ethylenically unsaturated derivatives of aromatic nuclei having hydroxy groups substituted ortho to said ethylenically unsaturated groups have a number of interesting properties which have prompted further investigation leading to the synthesis of additional vinyl monomers of this type. Thus, British Patent No. 807,198 reports on the preparation of polymers from both vinyl and allyl salicylate. The latter monomers are prepared by means of an ester exchange reaction whose general method is outlined in U.S. Patent No. 2,299,862 which in the case of vinyl salicylate, for example, calls for the reaction of salicylic acid with a large excess of vinyl acetate in the presence of catalytic amounts of mercuric acetate. Although this technique is fairly direct, it nonetheless requires a number of post-reaction separation procedures in order to be able to isolate the desired product from the large excess of unreacted vinyl acetate as well as from the acetic acid which is produced as a by-product.

U.S. Patent No. 2,961,426 discloses the ortho-acrylyl phenols and their subsequent use in the preparation of polymers. The latter monomers are, however, prepared by means of a rather lengthy and tedious three-step process involving esterification of a phenol with beta-chloropropionyl chloride, isomerization of the thus formed ester with aluminum chloride to the ortho-(beta-chloropropionyl)phenol followed by the dehydrohalogenation of the latter with sodium acetate, in alcohol, to give the desired ortho-acrylyl phenol. Needless to say, a process of such obvious complexity is not readily adaptable for commercial utilization.

It is the object of this invention to produce a novel class of ethylenically unsaturated derivatives of ortho-dihydric phenols, said derivatives being capable of undergoing vinyl type polymerization reactions either alone or in the presence of other vinyl type comonomers.

A further object of this invention involves the preparation of polymerizable derivatives of ortho-dihydric phenols which can be incorporated into a wide variety of polymers and copolymers so as to provide such polymers with sites for subsequent reaction with diazonium salts, the latter reaction thereby converting said polymers into integrally colored compositions.

An additional object of this invention relates to the preparation of ethylenically unsaturated derivatives of ortho-dihydric phenols which may be utilized as chelating agents as may also the polymers and copolymers which can be prepared from these derivatives.

The novel compositions of our invention are the ethylenically unsaturated derivatives of ortho-dihydric phenols which correspond to the formula:

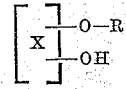

wherein X is a radical of the benzene series selected from among the group consisting of phenyl and naphthyl radicals having said hydroxy, i.e.—OH, and alkoxy, i.e.—OR, groups substituted thereon in positions which are ortho with respect to one another, and wherein R is an ethylenically unsaturated radical selected from among the class consisting of beta-hydroxy-propyl acrylate, i.e.

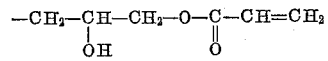

and beta-hydroxy-propyl methacrylate, i.e.

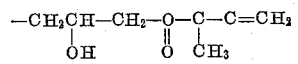

radicals.

The following list is representative of the derivatives of our invention. For purposes of brevity, this list notes only the beta-hydroxypropyl acrylate derivatives; however, it is of course to be understood that the corresponding beta-hydroxypropyl methacrylate derivatives may also be prepared where so desired. One may thus list: 2-hydroxy - 3 - (2 - hydroxy - phenoxy)propyl acrylate; 2-hydroxy - 3 - (1 - hydroxy - 2 - naphthoxy)propyl acrylate; and 2 - hydroxy - 3 - (2 - hydroxy - 3 - naphthoxy)propyl acrylate.

Thus, it is to be seen that the compounds of our invention may be referred to as ethylenically unsaturated derivatives of ortho-dihydric phenols; or, more specifically, as the beta-hydroxypropyl acrylate and the beta-hydroxypropyl methacrylate ethers of ortho-dihydric phenols.

All of the above listed compounds as well as the others which correspond to the above described formula, are materials which are capable of readily undergoing vinyl type polymerization reactions. They are thus useful for the preparation of homopolymers and, more particularly, for the preparation of copolymers with other vinyl type monomers. Further details relating to the preparation of these polymers may be obtained in our copending application, Serial No. 228,021, filed Oct. 3, 1962, and assigned to the assignee of the subject application.

Such polymers and copolymers possess a rather useful and unusual property. Thus, we have found that they may be reacted with diazonium salts so as to thereby provide these polymers with an integral or "built-in" color. In effect, by subjecting these polymers to the latter reaction, they are converted into what may be described as polymeric azo type dyes. Further details relating to the reaction, with diazonium salts, of polymers containing the derivatives of our invention may be found in our copending application, Serial No. 243,983, filed Dec. 12, 1962, and assigned to the assignee of the subject application.

Another useful property characteristic of the novel derivatives of our invention resides in the fact that they may be utilized as chelating agents, i.e. they may be used to remove or scavenge metallic ions from aqueous solutions or from solutions of water soluble organic solvents. Moreover, this same chelating ability is also displayed by the polymers and copolymers which may be derived from our ethylenically unsaturated derivatives of ortho-dihydric phenols.

In brief, the synthesis of our novel derivatives is accomplished by means of a simple, one-step procedure involving the catalyzed reaction of an ortho-dihydric phenol intermediate together with either glycidyl acrylate or methacrylate. Thus, where glycidyl acrylate is utilized, the resulting derivatives are the beta-hydroxypropyl acrylate ethers of their respective ortho-dihydric phenol intermediates; whereas, when glycidyl methacrylate is employed, the resulting derivatives are the beta-hydroxypropyl methacrylate ethers of their respective ortho-dihydric phenol intermediates.

The ortho-dihydric phenols which are applicable for use as intermediates in the process of our invention are compounds corresponding to the following formula:

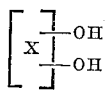

wherein X is a radical of the benzene series selected from among the group consisting of phenyl and naphthyl radicals having said hydroxy, i.e. —OH, groups substituted thereon in positions which are ortho with respect to one another.

As examples of the ortho-dihydric phenols which may be utilized as intermediates in our process, one may list:

ortho-dihydroxybenzene

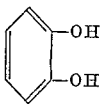

1,2-dihydroxynaphthalene

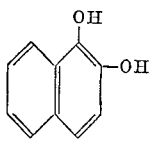

and 2,3-dihydroxynaphthalene

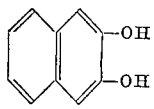

Hereinafter, it is to be understood that the use, for purposes of brevity, of the expression, "the ortho-dihydric phenol intermediate," is meant to include any of the above listed intermediates as well as any others which may correspond to the above noted formula which was given to represent these intermediates.

The importance of utilizing ortho- rather than meta- or para-substituted dihydric phenols as intermediates in the process of our invention, resides in the fact that the use of such meta- or para-substituted intermediates would give rise to large amounts of undesirable difunctional derivatives, i.e. the derivatives would contain two ethylenically unsaturated groups. Such difunctional monomers are of considerably less interest than their comparable monofunctional monomers inasmuch as they do not possess any chelating ability and, of greater significance, on being polymerized they yield highly crosslinked polymers as opposed to the linear polymers which result from the polymerization of the monofunctional derivatives of our invention. In addition to being crosslinked, the polymers prepared from the difunctional derivatives produced from such meta- or para-dihydric phenol intermediates no longer contain active sites for subsequent reaction with diazonium salts and would, moreover, no longer function as chelating agents.

In conducting the reaction which leads to the synthesis of our novel derivatives, the glycidyl acrylate or methacrylate is first ordinarily admixed with the selected catalyst. The latter may be chosen from among any member of the group consisting of the alkali metal hydroxides, such as sodium hydroxide or potassium hydroxide; the salts of the alkali metals, such as sodium bicarbonate or sodium chloride; and, the quaternary ammonium halides, such as tetramethylammonium chloride or tetrabutylammonium iodide. These catalysts should be present in a concentration of about 0.1 to 5.0%, as based upon the weight of the glycidyl acrylate or methacrylate.

Following the initial preparation of the mixture comprising the catalyst and the glycidyl acrylate or methacrylate, there is then added, with continued agitation, the selected ortho-dihydric phenol intermediate. The latter is preferably added in a concentration amounting to a stoichiometric excess, in the order of from 10 to 25%, over the glycidyl acrylate or methacrylate so as to minimize the possibility of a secondary reaction which would result in the production of diether derivatives of the ortho-dihydric phenol intermediates.

It should be emphasized that the manner in which the various reactants are combined is not critical to the process of this invention and may be altered by the practitioner to suit his particular needs. It is, in fact, possible to admix the reactants and the catalyst in any desired order. In any event, following the complete admixture of the ortho-dihydric phenol intermediate with the catalyst and the glycidyl acrylate or methacrylate, agitation is continued while the resulting reaction mixture is maintained at a temperature in the range of about 40 to 100° C., and preferably at about 70 to 80° C., for periods of about 5 to 12 hours. Under these conditions, the reaction between the ortho-dihydric phenol intermediate and the glycidyl acrylate or methacrylate will ordinarily proceed to a conversion in the range of about 70 to 85%.

In general, it should be noted that the preparation of the derivatives of our invention may be conducted at any temperature which will be high enough to result in an adequate reaction rate but which will not be so high as to cause the spontaneous polymerization of the resulting ethylenically unsaturated ortho-dihydric phenol derivative. In addition, the length of the reaction period will depend, for the most part, upon the specific ortho-dihydric phenol intermediate which is being utilized. Thus, it is a matter of simple experience and judgement on the part of the practitioner to determine the precise combination of time and temperature which will best be suited for the synthesis of any of the novel ortho-dihydric phenol derivatives coming within the scope of our invention.

Mention may be made at this time that in those cases wherein the ultimate ethylenically unsaturated derivative of the ortho-dihydric phenol is known to undergo spontaneous homopolymerization, there may also be added to the reaction mixture from about 0.001 to about 0.1%, as based upon the initial weight of the ortho-dihydric phenol intermediate, of a polymerization inhibitor such as benzoquinone.

Upon the completion of the reaction, and with subsequent cooling of the reaction vessel to room temperature, the resulting products will ordinarily be in the form of viscous liquids. For most purposes, including any subsequent polymerization reactions, this crude derivative should be purified so as to remove the relatively small amount of unreacted ortho-dihydric phenol intermediate. Thus, such means as chromatographic separation techniques, as for example with the use of a silica gel column, have been found to yield a product which, by means of a saponification equivalent analysis, will indicate a purity of close to 100%. Other separation techniques, such as alkaline or organic solvent extraction procedures, may also be used where so desired by the practitioner.

It is also possible, if so desired, to prepare the novel derivatives of our invention by reaction in an organic solvent medium. Under these conditions, the ortho-dihydric phenol intermediate, the catalyst, and the glycidyl acrylate or methacrylate may all be dissolved in a nonreactive polar solvent, such as acetone, tetrahydrofuran, dimethylformamide, dimethylsulfoxide, methyl ethyl ketone, or butyl acetate. The resulting derivative is then recovered by distilling off the solvent whereupon the crude product may be purified by means of the above noted techniques.

The following examples will further illustrate specific embodiments of this invention. In these examples, all parts given are by weight unless otherwise noted.

Example I

This example illustrates the preparation of 2-hydroxy-3-(2-hydroxyphenoxy)propyl acrylate, i.e.

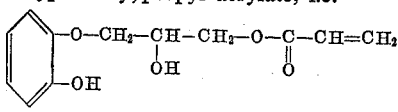

by means of the process of our invention.

An agitated mixture of 128 parts of glycidyl acrylate, 121 parts of ortho-dihydroxybenzene, and 2.5 parts of tetramethylammonium chloride was heated to a temperature in the range of 70° C. and maintained at this temperature for a period of 8 hours. Upon being cooled to 20° C., the resulting reaction product, which was in the form of a viscous liquid, was removed and subjected to a base titration. The latter analysis revealed that there was about 10% of unreacted ortho-dihydroxybenzene present within this reaction product which thereby indicated a conversion of 79% or a yield of about 188 parts 2-hydroxy-3-(2-hydroxyphenoxy)propyl acrylate.

Example II

This example illustrates the preparation of 2-hydroxy-3-(2-hydroxyphenoxy)propyl methacrylate, i.e.

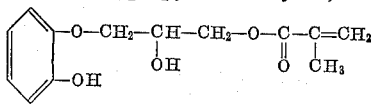

by means of the process of our invention.

An agitated mixture of 142 parts of glycidyl methacrylate, 121 parts of ortho-dihyroxybenzene, and 1.2 parts of sodium hydroxide was heated to a temperature in the range of 80° C. and maintained at this temperature for a period of 10 hours. Upon being cooled to 20° C., the resulting reaction product, which was in the form of a viscous liquid, was removed and subjected to a base titration. The latter analysis revealed that there was about 12% of unreacted ortho-dihydroxybenzene present within this reaction product which thereby indicated a conversion of 74.5% or a yield of about 188 parts of 2-hydroxy-3-(2-hydroxyphenoxy)propyl methacrylate.

Example III

The following table presents the pertinent data relating to the preparation of four additional ethylenically unsaturated derivatives of ortho-dihydric phenols. In this table, derivatives #1 and 2 were prepared using 1,2-dihydroxynaphthalene as the ortho-dihydric phenol intermediate, and derivatives #3 and 4 were prepared using 2,3-dihydroxynaphthalene as the ortho-dihydric phenol intermediate. Moreover, derivatives #1 and 3 are beta-hydroxypropyl arcylate ethers of their respective ortho-dihydric phenol intermediates which were prepared by means of the procedure of Example I, where derivatives #2 and 4 are beta-hydroxypropyl methacrylate ethers of their respective ortho-dihydric phenol intermediates which were prepared by means of the procedure of Example II.

| No. | Name | Parts Ortho-Dihydric Phenol Intermediate | Parts Glycidyl Acrylate | Parts Glycidyl Methacrylate | Percent Conversion | Yield (Parts by wt.) |
|---|---|---|---|---|---|---|
| 1 | 2-hydroxy-3-(1-hydroxy-2-naphthoxy)propyl acrylate. | 176 | 128 | | 80 | 231 |
| 2 | 2-hydroxy-3-(1-hydroxy-2-naphthoxy)propyl methacrylate. | 176 | | 142 | 78 | 236 |
| 3 | 2-hydroxy-3-(2-hydroxy-3-naphthoxy)propyl acrylate. | 176 | 128 | | 85 | 245 |
| 4 | 2-hydroxy-3-(2-hydroxy-3-naphthoxy)propyl methacrylate. | 176 | | 142 | 81 | 244 |

STRUCTURAL FORMULA

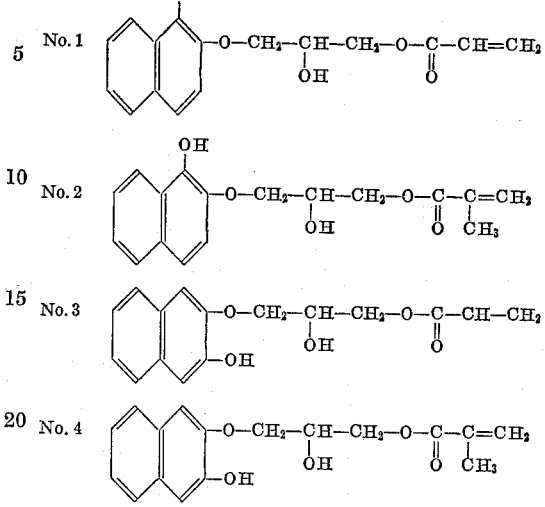

Example IV

This example illustrates the chelating ability of one of the novel derivatives of our invention.

A solution of 25 parts of 2-hydroxy-3-(2-hydroxyphenoxy)propyl methacrylate, whose preparation was described in Example II, was prepared in 100 parts of a 1:1 mixture of ethanol and water. To the latter solution, there was then added a solution 20 parts of cupric acetate monohydrate in 100 parts of a 1:1 mixture of ethanol and water. A precipitate of a blue-green copper chelate was immediately formed. This precipitate was then filtered, washed with aqueous ethanol and dried. Repeated extraction of this solid with warm water did not produce any loss in weight thereby indicating that the copper was tightly bound in the form of a chelate. However, treatment with 6 N hydrochloric acid caused decomposition of the chelate to cupric chloride and the 2-hydroxy-3-(2-hydroxyphenoxy)propyl methacrylate.

Although the above disclosure is seen to encompass the reaction between glycidyl acrylate or methacrylate with an ortho-dihydric phenol having either a phenyl or naphthyl nucleus, it is of course to be understood that ortho-dihydric phenols having naphthyl or phenyl nuclei which have been substituted, as for example with low molecular weight hydrocarbon groups, may also be utilized in preparing the derivatives of our invention.

It should also be pointed out that although the process of our invention has been limited to the reaction of ortho-dihydric phenols with either glycidyl acrylate or methacrylate, it is to be noted that one may also, if desired, prepare comparable derivatives utilizing, as substitutes for the glycidyl acrylate or methacrylate, such reagents as allyl glycidyl ether, butadiene monoxide, glycidyl crotonate and glycidyl alkyl maleates as well as any other available epoxides having ethylenically unsaturated linkages.

Finally, it may be mentioned that as an alternate procedure for preparing the novel ethylenically unsaturated derivatives of our invention, one may react an ortho-dihydric phenol with epichlorohydrin so as to yield its chlorohydroxypropyl ether which is then, in turn, reacted with the sodium or potassium salt of either acrylic or methacrylic acid in order to yield the desired beta-hydroxypropyl acrylate or methacrylate ether.

Summarizing, our invention is thus seen to provide the practitioner with a novel class of ethylenically unsaturated derivatives of ortho-dihydric phenols. Variations may be made in proportions, procedures and materials without departing from the scope of this invention as defined in the following claims.

What is claimed is:

1. The ethylenically unsaturated derivatives of ortho-dihydric phenols which correspond to the formula:

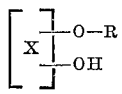

wherein X is a radical of the benzene series selected from the group consisting of phenyl and naphthyl radicals carrying said hydroxy and alkoxy groups thereon in positions which are ortho with respect to one another, and wherein R is an ethylenically unsaturated radical selected from the class consisting of beta-hydroxypropyl acrylate and beta-hydroxypropyl methacrylate groups.

2. 2-hydroxy-3-(2-hydroxyphenoxy)propyl acrylate.
3. 2-hydroxy-3-(2-hydroxyphenoxy)propyl methacrylate.
4. 2-hydroxy-3-(1-hydroxy-2-naphthoxy)propyl acrylate.
5. 2-hydroxy-3-(1-hydroxy-2-naphthoxy)propyl methacrylate.
6. 2-hydroxy-3-(2-hydroxy-3-naphthoxy)propyl acrylate.
7. 2-hydroxy-3-(2-hydroxy-3-naphthoxy)propyl methacrylate.

References Cited in the file of this patent
UNITED STATES PATENTS 2,500,011  Sexton _____ Mar. 7, 1950
2,734,087  Berger _____ Feb. 7, 1956

OTHER REFERENCES

Wagner: Synthetic Organic Chemistry, pages 233–234 (1953).

UNITED STATES PATENT OFFICE
CERTIFICATE OF CORRECTION

Patent No. 3,156,720                         November 10, 1964

Albert I. Goldberg et al.

It is hereby certified that error appears in the above numbered patent requiring correction and that the said Letters Patent should read as corrected below.

Column 2, lines 10 to 13, the formula should appear as shown below instead of as in the patent:

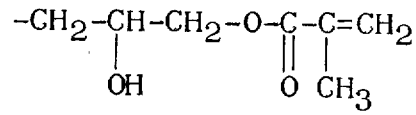

column 6, lines 15 to 19, formula No. 3 should appear as shown below instead of as in the patent:

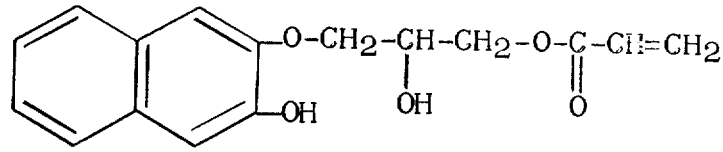

Signed and sealed this 13th day of April 1965.

(SEAL)
Attest:

ERNEST W. SWIDER
Attesting Officer

EDWARD J. BRENNER
                                      Commissioner of Patents